United States Patent [19]

Ogura et al.

[11] 3,927,244
[45] Dec. 16, 1975

[54] COMPOSITE FILM

[75] Inventors: Shuichi Ogura; Hirotsura Chow; Toshio Kawamata, all of Tokyo, Japan

[73] Assignee: Fuji Photo Film Co., Ltd., Minami-ashigara, Japan

[22] Filed: Aug. 6, 1973

[21] Appl. No.: 385,770

[30] Foreign Application Priority Data

Aug. 7, 1972 Japan.................................. 47-78874

[52] U.S. Cl. ................ 428/483; 428/327; 428/328; 428/480
[51] Int. Cl.²..................... B32B 27/20; B32B 27/36
[58] Field of Search.................. 117/138.8 F, 161 K, 117/161 KP, 161 UC; 96/87 R

[56] References Cited
UNITED STATES PATENTS

| | | | |
|---|---|---|---|
| 3,136,655 | 6/1964 | Wolinski | 117/122 |
| 3,158,494 | 11/1964 | Eikvar et al. | 117/45 |
| 3,449,467 | 6/1969 | Wynstra | 260/850 |
| 3,505,293 | 4/1970 | Bond et al. | 260/75 |
| 3,584,075 | 6/1971 | Bock et al. | 260/858 |
| 3,607,375 | 9/1971 | Wiejak | 117/138.8 UA |
| 3,607,975 | 9/1971 | Tsukada et al. | 260/850 |
| 3,619,276 | 11/1971 | Shimeha et al. | 117/138.8 F |

FOREIGN PATENTS OR APPLICATIONS 828,922   2/1960   United Kingdom .......... 117/138.8 F

*Primary Examiner*—P. E. Willis, Jr.
*Attorney, Agent, or Firm*—Sughrue, Rothwell, Mion, Zinn & Macpeak

[57] ABSTRACT

A heat-bondable composite film especially suited for use in storing documents and making identification cards. The film comprises a polyester film and a coating of a composition containing at least one of (a) a polyethylene terephthalate oligomer, (b) a polyglycol terephthalate copolymer, (c) a composition consisting of a blend of a polyglycol terephthalate copolymer with a linear thermoplastic polyurethane elastomer or a mixture of it with a polyisocyanate, and (d) a composition consisting of a blend of a polyglycol terephthalate copolymer with at least one of poly (vinyl acetate), an ethylene/vinyl acetate copolymer and a tacky polyolefin. The coating composition can further contain a filler to improve the bond strength and bending resistance of the coating.

15 Claims, 2 Drawing Figures

COMPOSITE FILM

BACKGROUND OF THE INVENTION

1. Field of the Invention

This invention relates to a composite film.

2. Description of the Prior Art

Previously, polyester films coated with a polyethylene-type adhesive have gained widespread use as heat-bondable films for document storage and identification cards. However, these films have poor transparency, and the bond strength between the polyester film and adhesive layer is weak. Conventional tents made of cloth are prone to absorb moisture, and those made of vinyl resins have weak strength. In addition on the conventional accordion-pleated curtains, window blinds, connecting cloths for cars of a train, etc., paints portions which are bent and flexed tend to come off and break.

SUMMARY OF THE INVENTION

According to the present invention, there is provided a composite film comprising a polyester film and coated on one or both surfaces thereof, a composition containing at least one member selected from the group consisting of (a) a polyethylene terephthalate oligomer, (b) a polyglycol terephthalate copolymer, (c) a composition comprising a blend of a polyglycol terephthalate copolymer with a linear thermoplastic polyurethane elastomer or a mixture of a linear thermoplastic polyurethane elastomer and a polyisocyanate, and (d) a composition comprising a blend of a polyglycol terephthalate copolymer with at least one of poly(vinyl acetate), and ethylene/vinyl acetate copolymer and a tacky polyolefin. In another aspect of this invention, the above-described coating composition contains additionally a filler.

FIG. 1 is a sectional view of a composite film having a coated layer on one surface, and FIG. 2 is a sectional view of a composite film having a coated layer on both surfaces.

DETAILED DESCRIPTION OF THE INVENTION

Figure 1:

The polymers or compositions used for making the composite film of this invention have markedly increased bond strength at room temperature for soft materials such as cloths, rubbers, or polyolefins and polar or non-polar materials, as compared with linear thermoplastic polyurethane elastomers in general use. When coated on polyester films, they do not come off on bending, nor do they show a reduction in strength. As a result, tents made of the film of this invention permit the housing of goods compactly and have markedly increased strength in comparison with conventional cloth tents and those of vinyl resins, respectively. In addition, the film of this invention when used for accordion pleated curtains, etc., overcomes the defects found in the conventionally used materials discussed above.

The film of this invention finds the following applications. Films obtained by coating one of the surfaces of a polyester film with the polymer or composition described above can be used as heatbondable films, e.g., using temperatures at about 80°-150°C, more generally at 110°-120°C, that have utility in storage of documents, making identification cards, etc. Since the bond strength between the coating and the base film is high, the identification cards cannot be forged or reproduced. When a filler such as a metal powder, pigment or matting agent is incorporated in the polymer or composition, the bond strength of the polymer or composition is high and it has good resistance to bending. The filler can be present at a level of from about 0.1 to 200 % by weight based on the total weight of components (a)–(d). The bond strength of the composition of this invention is high, thus permitting, where desired, the use of high levels of filler material therefore, when a polyester film coated with such a polymer or composition is bended in the form of a bellows and used, for example, as a partition wall, the coating of the film does not come off, and the bent portions do not show any reduction in strength. For this reason, it is not necessary to apply a protective film on the coated layer, and the film is thin, has high strength, can be folded compactly, and does not absorb moisture, as compared with cloths or other plastic films. Accordingly, the composite films of this invention find a wide range of applications such as simple tents, simple garages, bonnets for vehicles such as lorries or leasure cars, cloths for connecting railway cars, window blinds, and partition walls for indoor use.

When the film of this invention containing aluminum powder in the coated layer is used for reflecting thermal rays or as window blinds, the photodegradation of the polyester base can be completely prevented if it is used with the coated layer containing the aluminum powder facing the direction of the thermal rays. Dyes or pigments can be incorporated in the polymer or composition so that the film can be used decorative purposes. Ultraviolet ray shielding films may be obtained by incorporating an ultraviolet absorbant in the polymer or composition. The utility of composite film of this invention is not limited to those described above, and there are other uses.

Figure 2:
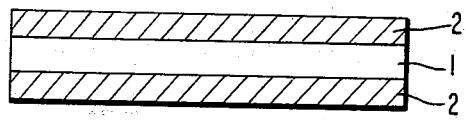

Referring now to FIGS. 1 and 2, in greater detail reference numeral 1 shows a polyester film, and reference numeral 2 represents a layer of a composition containing at least one member selected from (a) a polyethylene terephthalate oligomer, (b) a polyglycol terephthalate copolymer, (c) a composition comprising a blend of a polyglycol terephthalate copolymer with a linear thermoplastic polyurethane elastomer or a mixture of a linear polyurethane elastomer with a polyisocyanate, and (d) a composition comprising a blend of a polyglycol terephthalate copolymer with at least one of poly (vinyl acetate), an ethylene/vinyl acetate copolymer and a tacky polyolefin, or a layer of said member further containing a filler.

With respect to the polyethylene terephthalate oligomer, (a), it is comprised of the reaction product of terephthalic acid and ethylene glycol, generally in an equal molar ratio of the terephthalic acid to the ethylene glycol. A degree of polymerization of from about 10 to 500 providing a non-crystalline viscous material is usually suitable. The polyethylene terephthalate oligomer used in this invention desirably has a degree of polymerization of not more than 100.

The polyglycol terephthalate copolymer and polyglycol terephthalate composition are disclosed in the specifications of Japanese Patent Publication No. 20313/68, Japanese Patent Application No. 9483/71, and Japanese Patent Application No. 46134/72. The polyglycol terephthalate copolymer, (b) has a degree of polymerization generally ranging from about 10 to about 500 and is comprised of the reaction product of a polyglycol, such as polyethylene glycol having a degree of polymerization ranging from about 10 to 100, and terephthalic acid. Polyglycols of glycols having the formula HO—A—OH where A is a bridging group can be utilized. Suitable bridging groups are $(CH_2)_n$ where n is an integer of from 3 to 20 $(CH_2CH_2O)_n$ is an integer of from 2 to 10 aromatic bridging groups, and the like. Examples of the glycols used are polymethylene glycols of general formula $HO(CH_2)_n OH$ wherein n is 3 to 20, polyethylene glycols of the general formula $HO(CH_2CH_2O)_nH$ wherein n is 2 to 10, alkylene glycols such as propylene glycol, neopentyl glycol, hexylene glycol, octylene glycol or cyclohexane-1,4-dimethanol, and compounds having an aromatic group between two hydroxyl groups as shown below.

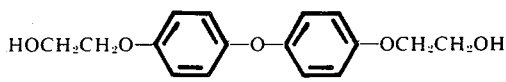

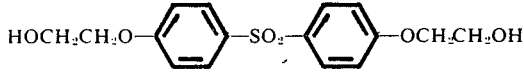

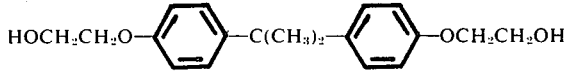

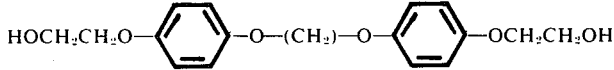

The polyurethane elastomer as one component of the composition used in this invention may be those conventionally defined in the art, and should desirably be linear and thermoplastic. Such urethane elastomers have a molecular weight ranging from 500 to 20,000. Specific examples are Pandex (Dainippon Ink and Chemical Incorporated), Parablen (Nippon Polyurethane Co. Ltd.), Iron rubber (Japan Oil Seal Co, Ltd.), and Elastolane (Japan Elastolan Co. Ltd.). The polyisocyanate is a compound having at least two functional groups. Specific examples include diisocyanates such as m-phenylene diisocyanate, p-phenylene diisocyanate, 2,6-tolylene diisocyanate or 2,4-tolylene diisocyanate, triisocyanates such as 4,4',4'-triphenyl metatriisocyanate, or triene-2,4,6-triisocyanate, and tetraisocyanates such as 4,4'-dimethyldiphenylmethane-2,2',5,5'-tetraisocyanate. Where a polyglycol terephthalate is mixed with the urethane elastomer, generally any of the polyglycol terephthalate of (b) can be employed at a level of from about 0.1 to 40 % by weight. Where a polyisocyanate additionally is present from about 0.1 to 10 % preferably, about 1 to about 5 %, by weight of the polyisocyanate along with the above set forth amount of the polyglycol terephthalate can be employed with the urethane elastomer.

For (d), the degree of polymerization of the polyglycol terephthalate which is suitable ranges from about 10 to 500. Any of the polyglycol terephthalate of (b) above are suitable. These materials are blended with at least one of a poly(vinyl acetate) generally having a molecular weight of about 500 to 50,000, a ethylene/vinyl acetate copolymer (weight ratio 90:10 to 60:40) of a molecular weight of about 500 to 50,000 and a tacky polyolefin, i.e., so called because of its low molecular weight, having a molecular weight ranging from about 300 to 5,000. Each of the poly(vinyl acetate), the ethylene/vinyl acetate copolymer and the tacky polyolefin can be used alone or as mixtures thereof, with each being present at a level of from about 0.1 to 40 % by weight and, where mixtures are used, at a total level of these component ranging from about 0.1 to 40 % by weight.

Examples of fillers that can be used in this invention are dye, organic pigments, inorganic pigments, matting agents, metal powders, ultraviolet absorbants, or antistatic agents. The dye and the matting agent can be used at a level of from about 0.1 to 50 % by weight, the ultraviolet absorbants and the antistatic agents at about 0.1 to 20 % by weight, the organic and inorganic pigments and the metal powder at about 0.1 to 200 % by weight, each of these weight, each of these weights being based on the weight of the resin binder components.

The dye may, for example, be 1-(p-methylphenylamino)-4-hydroxyanthraquinone, 1,4-diphenylamino anthraquinone, 1-anilino-4-hydroxyanthraquinone, 1,4-di(m-methylphenylamino)-anthraquinone, and 1-(m-methylphenylamino)-4-hydroxyanthraquinone. Examples of organic pigments are pigments of the azo, triphenylmethane, quinoline, and anthraquinone types. The inorganic pigment may, for example, be carbon black, titanium white, lead white, red iron oxide, or ultramarine. Examples of matting agents are silicon dioxide powder, alumina powder, polyethylene powder, and polyacrylonitrile powder. The metal powder may, for example, be aluminum, zinc or brass powder. Examples of the ultraviolet absorbant are hydroxybenzophenone, benzotriazole, and salicylic acid esters. Examples of antistatic agents are anionic antistatic agents such as naphthalene sulfonate or a sulfoester of 2-methylene-carboxylic acid, cationic antistatic agents such as alkyl phosphoric acid esters, or tetraethylene pentamine salts, and non-ionic antistatic agents such as higher alcohols or ethylene oxide adducts.

The composite film of this invention is produced, for example, by solution coating or melt extrusion. In the solution coating method, at least one of a ketone such as acetone and methyl ethyl ketone, a chlorinated hydrocarbon such as methylene chloride or tetrachloroethane, and an aromatic hydrocarbon such as benzene, toluene or xylene is used.

The thickness of the composite film of this invention is optional depending upon the intended use, and can be easily determined by those skilled in the art.

The following Examples are given to illustrate the invention in greater detail. In all of the Examples, all parts are by weight.

EXAMPLE 1

9 Parts of a polytriethylene glycol terephthalate copolymer (adhesive disclosed in Japanese Patent Publication No. 20313/68 the reaction product of triethylene glycol and terephthalate acid having a degree of polymerization of about 50 to 75) was dissolved in 91 parts of a 9:1 by volume mixed solvent of methylene chloride and tetrachloroethane, and the resulting solution was coated on one surface of a 180 μ thick, biaxially oriented polyethylene terephthalate film in a thickness of 30 μ. The resulting film was used for identification cards.

EXAMPLE 2

80 Parts of a polydiethylene glycol terephthalate copolymer (adhesive disclosed in Japanese Patent Publication No. 20313/68 the reaction product of diethylene glycol and terephthalic acid having a degree of polymerization of about 60 to 90) was mixed with 40 parts of polyurethane (Elastolane, product of Japan Elastolan a polyurethane having an average molecular weight ranging from about 5000 to 10,000). In the resulting mixture was incorporated 60 parts of aluminum powder (100 mesh). The entire mixture was melt-extruded through an extruder to coat the extrudeate on a 120 μ thick biaxially oriented polyethylene terephthalate film at a thickness of about 3 μ.

The film of this Example had utility as a thermal ray shielding film, and reflected 75 % of the thermal rays. By using a dye, pigment, matting agent, etc. as a filler, the composition described in this Example gives films suitable for use as tents, garages, bonnets of automobiles, connecting cloths for railway cars, window blinds, and indoor partition walls.

EXAMPLE 3

An adhesive (described in Japanese Patent Application No. 9483/71) consisting of a mixture of 70 parts of a polyhexamethylene glycol terephthalate copolymer having a degree of polymerization of about 40–60 and 30 parts of an ethylene/vinyl acetate copolymer (60: 40 weight ratio) was melted, and 50 parts of titanium white was incorporated in it. The mixture was extruded through a melt extruder to coat the mixture on a 75 μ thick biaxially oriented polyethylene terephthalate film at a thickness of about 30 μ. The film obtained was used for interior decoration, etc. and could be readily applied by heat-bonding at temperatures of 90°–150°C.

What we claim is:

1. A composite film comprising a polyester film and coated on one or both surfaces thereof, a composition containing at least one member selected from the group consisting of:
    a. a polyethylene terephthalate oligomer,
    b. a polyglycol terephthalate copolymer,
    c. a composition comprising a blend of a polyglycol terephthalate copolymer with a linear thermoplastic polyurethane elastomer;
    d. a composition comprising a blend of a polyglycol terephthalate copolymer with a mixture of a linear thermoplastic polyurethane elastomer and a polyisocyanate; and
    e. a composition comprising a blend of a polyglycol terephthalate copolymer with at least one of poly(vinyl acetate), an ethylene/vinyl acetate copolymer and a tacky polyolefin, said member permitting said composite film to be heat-bondable at a temperature of 110°–120°C.

2. The composite film of claim 1, wherein said composition additionally contains a filler.

3. The composite film of claim 2, wherein said filler is a dye, an organic pigment, an inorganic pigment, a matting agent, a metal powder, a ultraviolet absorbant or an antistatic agent.

4. The composite film of claim 1, wherein said polyethylene terephthalate oligomer has a degree of polymerization of not more than 100.

5. The composite film of claim 1, wherein said polyurethane elastomer has a molecular weight of 500 to 20,000.

6. The composite film of claim 1, wherein said polyisocyanate is selected from the group consisting of diisocyanates, triisocyanates and tetraisocyanates.

7. The composite film of claim 1, wherein the glycol units of said polygylcol terephthalate copolymer are selected from the group consisting of polymethylene glycols of the formula $HO(CH_2)_nOH$ wherein $n$ is 3 to 20 and polyethylene glycols of the formula $HO(CH_2CH_2O)_nH$ wherein $n$ is 2 to 10.

8. The composite film of claim 1, wherein the glycol units of said polyglycol terephthalate copolymer are alkylene glycol units.

9. The composite film of claim 1, wherein the glycol units of said polyglycol terephthalate copolymer are units of a glycol containing an aromatic group bridging two hydroxyl groups.

10. The composite film of claim 1, wherein said member is a polyethylene terephthalate oligomer.

11. The composite film of claim 1, wherein the member is a polyglycol terephthalate copolymer.

12. The composite film of claim 1, wherein the member is a composition comprising a blend of a polyglycol terephthalate copolymer with a linear thermoplastic polyurethane elastomer.

13. The composite film of claim 1, wherein the member is a composition comprising a blend of a polyglycol terephthalate copolymer with a mixture of a linear thermoplastic polyurethane elastomer and a polyisocyanate.

14. The composite film of claim 1, wherein the member is a composition comprising a blend of a polyglycol terephthalate copolymer with at least one of poly(vinyl acetate), an ethylene/vinyl acetate copolymer and a tacky polyolefin.

15. The composite film of claim 3, wherein said filler is aluminum powder, which aluminum powder prevents photo degradation of said polyester film.

* * * * *